United States Patent [19]

Kato

[11] Patent Number: 5,439,651
[45] Date of Patent: Aug. 8, 1995

[54] CATALYZER SUPPORT SYSTEM FOR EXHAUST CLEANING OF OUTBOARD MOTOR

[75] Inventor: Masahiko Kato, Hamamatsu, Japan

[73] Assignee: Sanshin Kogyo Kabushiki Kaisha, Hamamatsu, Japan

[21] Appl. No.: 126,913

[22] Filed: Sep. 24, 1993

[30] Foreign Application Priority Data

Sep. 25, 1992 [JP] Japan ................... 4-279196

[51] Int. Cl.6 ............................ B01D 53/94
[52] U.S. Cl. ............................ 422/179; 55/DIG. 30; 60/302; 422/180; 422/221; 422/311; 440/89
[58] Field of Search ............ 422/177, 178–181, 422/211, 218, 221, 222, 311; 60/297–299, 302, 321; 440/89; 123/65 PE, 65 EM; 502/439, 527; 55/343, 484, DIG. 30; 96/137

[56] References Cited

U.S. PATENT DOCUMENTS

| 4,004,888 | 1/1977 | Musall et al. | 422/179 |
| 4,225,561 | 9/1980 | Torres | 422/180 |
| 4,735,046 | 4/1988 | Iwai | 60/295 |
| 4,820,492 | 4/1989 | Wada et al. | 422/176 X |
| 5,067,319 | 11/1991 | Moser | 60/297 |
| 5,174,112 | 12/1992 | Sougawa et al. | 60/302 |

FOREIGN PATENT DOCUMENTS 61-18009 5/1986 Japan.

*Primary Examiner*—Peter Kratz
*Attorney, Agent, or Firm*—Knobbe, Martens, Olson & Bear

[57] ABSTRACT

A catalytic exhaust treatment system for an outboard motor wherein a catalyst bed is supported within the exhaust pipe on a support plate that permits the catalyst bed to expand and contract relative to the surrounding exhaust pipe from which it is spaced. The exhaust gases can flow through the catalyst bed and, around the catalyst bed for complete treatment.

8 Claims, 2 Drawing Sheets

CATALYZER SUPPORT SYSTEM FOR EXHAUST CLEANING OF OUTBOARD MOTOR

BACKGROUND OF THE INVENTION

This invention relates to a catalyzer support system for an internal combustion engine exhaust system and more particularly to an improved arrangement for supporting an exhaust treatment catalyzer in the exhaust system of an outboard motor.

The use of catalyzers for treating the exhaust gases of internal combustion engines is well known. A wide variety of catalyzer types have been employed for treating certain exhaust gas constituents prior to their release to the atmosphere so as to reduce the amount of harmful exhaust gas constituents. Although effective, there are many applications in which difficulties result in the provision of catalytic treatment of the exhaust gases.

A prime example of an application where catalyzer treatment is difficult is in outboard motors. As is well known, an outboard motor is an extremely compact device and offers a minimum amount of space and room for exhaust treatment. In addition, the exhaust system of an outboard motor includes a large area that is at least partially submerged during engine running conditions. When this amount of water is present in the exhaust system, it must be readily insured that the water cannot contact the catalyst bed as it will cause it extreme damage to it.

Furthermore, it is necessary to provide a good support for the catalyzer that will insure that a large portion or substantially all of the exhaust gases must pass into contact with the catalyzer. Frequently, the catalyzer is formed as a ceramic base and this requires careful support for the catalyzer.

It is well known that the temperature of the exhaust gases is quite high when running and that the catalyzer further elevates the temperature of the exhaust gases. Thus, there are substantial variations in temperature in the catalyzer and its support during various conditions of operation and ambient conditions. If these temperature variations are not accommodated, then large forces may be exerted upon the catalytic material as its temperature increases and because of the brittleness of the ceramic material, damage can result.

Frequently it is also a practice to provide some arrangement for cooling the area surrounding the catalytic bed so as to avoid the transmission of the high heat from the catalyst to the remaining components of the outboard motor, Frequently, water cooling jackets are employed for this purpose and this gives rise to further problems not only in the support for the catalyst, but the temperature variations which it experiences.

It is, therefore, a principal object to this invention to provide an improved catalyst arrangement for the exhaust gases of an internal combustion engine.

It is a further object to this invention to provide an improved catalytic system for an outboard motor.

It is a yet further object to this invention to provide an improved and compact catalytic system for an outboard motor that will insure full treatment of the exhaust gases and yet afford a support for the catalyst that will insulate it from thermal damage.

SUMMARY OF THE INVENTION

This invention is adapted to be embodied in a catalytic exhaust treatment system for an outboard motor that is comprised of an internal combustion engine having an exhaust port and an exhaust pipe having an inlet end communicating with the exhaust port and an outlet end for conveying exhaust gases to the atmosphere. A catalytic support is positioned in the exhaust pipe and a catalyst is supported on the catalytic support spaced inwardly from the inner periphery of the exhaust pipe so as allow room for thermal expansion and contraction of the catalytic bed without subjecting it to high forces.

DETAILED DESCRIPTION OF THE PREFERRED EMBODIMENT OF THE INVENTION

Figure 1:
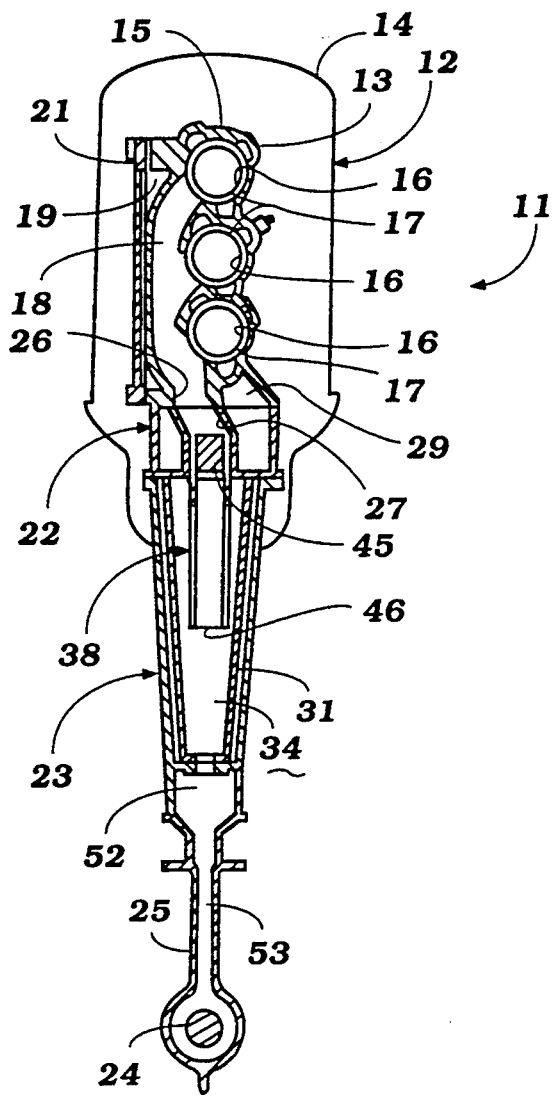
FIG. 1 is an elevational view of an outboard motor constructed in accordance with an embodiment of the invention, with portions shown in cross section.

Referring now in detail to the drawings, an outboard motor having a catalytic exhaust treatment system constructed in accordance with an embodiment of the invention is shown partially and is identified generally by the reference numeral 11. It is to be understood that the invention is described in conjunction with an outboard motor for exemplary purposes although certain aspects of the invention may be applied with other applications for internal combustion engines having catalytic exhaust systems. However, for the reasons aforenoted, the invention has particular utility in outboard motors because of their compact construction and because of the particular problems attendant with the presence of large amounts of water in the exhaust system of such outboard motors, under at least some conditions.

The outboard motor 11 is comprised of a powerhead, indicated generally by the reference numeral 12 which is comprised of internal combustion engine 13 and a surrounding protective cowling 14 with the protective cowling 14 being shown only schematically in the figures.

In the illustrated embodiment, the engine 13 is depicted as being of the three cylinder, in-line type and operates on a two stroke, crankcase, compression principal that is comprised of a cylinder block 15 having three aligned cylinder bores 16 formed by cylinder liners 17 that are pressed or cast into the cylinder block 15 in a manner well known in this art. Again, the type of engine with which the invention is practiced may be considered to be exemplary and it should be readily apparent to those skilled in the art how the invention may be practiced with engines of other cylinder numbers and other cylinder configurations as well as rotary engines and engines operating on the four stroke as well as on a two stroke principal. However, the invention has particular utility in conjunction with two stroke engines, again because of their common application with outboard motors.

Since the invention deals primarily with the exhaust system, however, the full details of the construction of the engine 13 are not believed to be necessary for those skilled in the art to understand or practice the invention and, for that reason, only the exhaust system for the engine 13 is depicted. Again, it is believed readily apparent to those skilled in the art how the invention can be practiced with a wide variety of types of engines.

The cylinder block 15 is provided with an integral exhaust manifold 18 to which exhaust gases are delivered from the cylinder bores 16 through exhaust ports (not shown) in the cylinder liners 17. A water jacket 19 is formed on the outer side of the exhaust manifold 18 and is closed by means of a closure plate 21 so that coolant from the engine cooling system may be circulated through the jacket 19 so as to perform a cooling function on the exhaust gases in the manifold 18.

The engine 13, as is typical with outboard motor practice, is supported upon a spacer plate assembly, indicated generally at the reference numeral 22 and which is interposed at an innerface between the powerhead 12 and a drive shaft housing, indicated generally by the reference numeral 23, which depends from the powerhead 12. As is typical with outboard motor practice, the engine 13 is disposed so that its cylinder bores 16 are horizontally disposed and the crankshaft (not shown) driven thereby rotates about a vertically extending axis. This crankshaft is connected to a drive shaft (not shown) which is contained within the drive shaft housing 23 and which drives a propeller shaft 24 either directly or through a forward, neutral, reverse transmission. The propeller shaft 24 is journalled in a lower unit 25 positioned beneath the drive shaft housing 23. The propeller shaft 24 has coupled to it a propeller or other propulsion device for propelling an associated watercraft through a body of water, as is well known in this art.

The exhaust manifold 18 has a downwardly facing exhaust outlet port 26 which cooperates with an exhaust passage 27 formed in the spacer plate 22. Surrounding the exhaust passage 27 is a water jacket 28 which receives coolant from the engine cooling jacket 29 so that coolant which has been delivered to the engine cooling jacket 29 by a coolant pump (not shown), but driven at the innerface between the lower unit 25 and the drive shaft housing 23 by the drive shaft in a known manner, is discharged. This cooling jacket 28 of the spacer plate 22 cools the exhaust gases and the catalytic system, to be described.

An inner shell 31 is supported within the drive shaft housing 23 by means of a flange portion 32 at its upper end which is connected to the spacer plate 22 by a plurality of threaded fasteners 33. The inner shell 31 defines an expansion chamber 34 and an outer cavity 35. Water from the engine cooling system is delivered to the expansion chamber 34 through a plurality of openings 36 formed around a lower flange 37 of the spacer plate 22. This permits the coolant to be discharged an also cools and silences the exhaust gases that flow into the expansion chamber 34.

Figure 3:
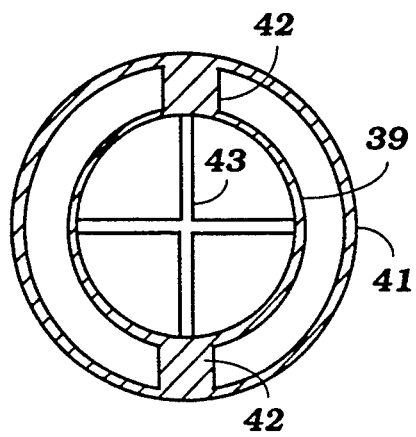
FIG. 3 is a cross sectional view taken along the line 3—3 of FIG. 2.

A double walled exhaust pipe, indicated generally by the reference numeral 31 is affixed to the spacer plate 22 and inner shell flange 32 by the threaded fasteners 33. The exhaust pipe 38 has an inner shell 39 and an outer shell 41 with the inner and outer shells being integrally connected to each other by a plurality of spaced apart lugs 42 (FIG. 3). The lugs 42 insure that the spacing between the inner and outer pipes 39 and 41 will be maintained.

At the upper end of the inner pipe 39, there is provided a catalyst bed support 43 which may be defined by an upwardly extending flange 44 which can form an extension of the inner shell 39. An annular catalyst bed 45 of cylindrical configuration in this embodiment is supported upon the catalyst support 43 which has a cruciform shape as best shown in FIG. 3 so as to provide an air flow path axially downwardly through the catalyst bed 45. The exhaust gases can then flow through the inner shell 39 of the exhaust pipe and be discharged into the expansion chamber 34 through a discharge opening 46 for expansion and further silencing.

Figure 2:
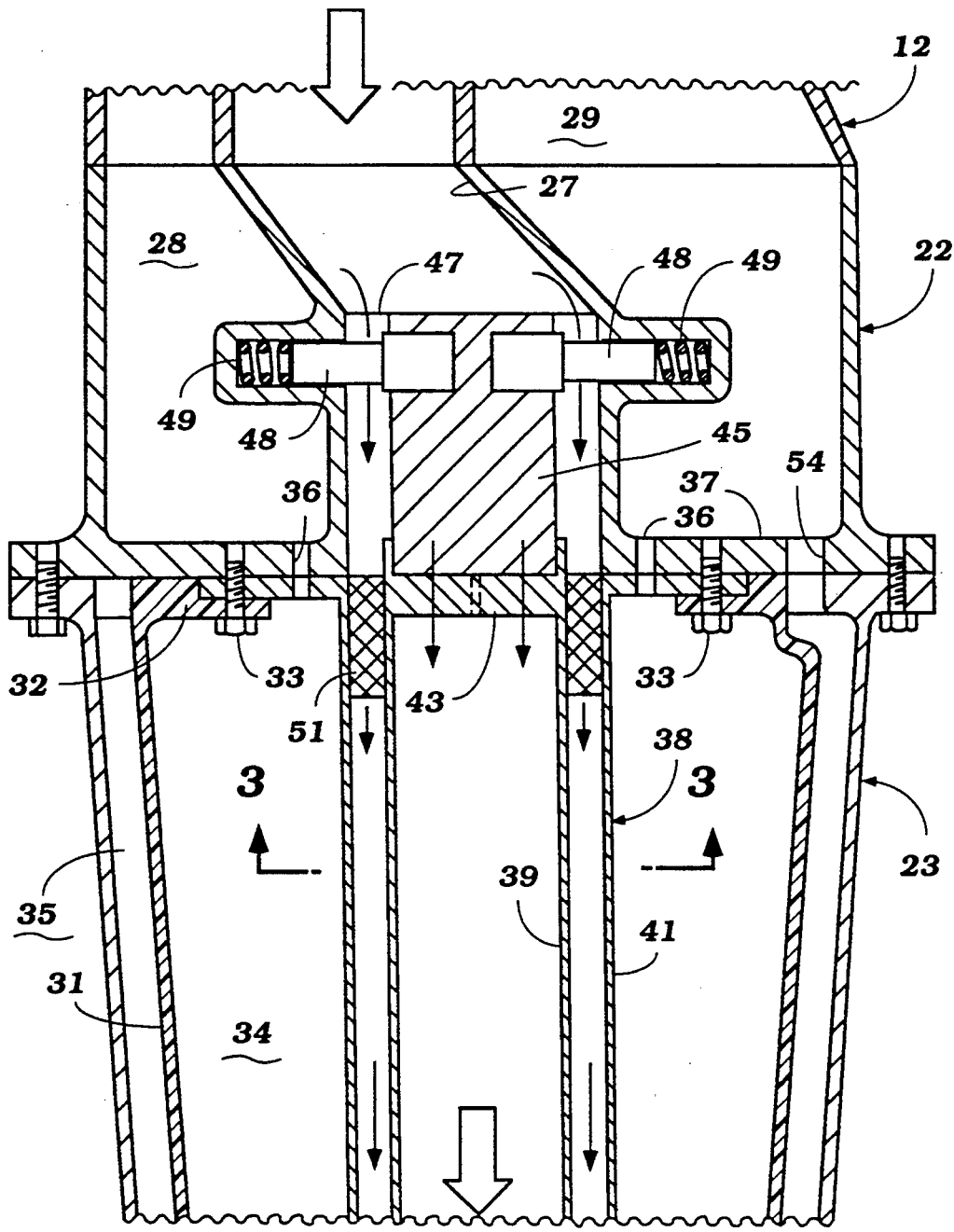
FIG. 2 is an enlarged view of a portion of the construction shown in FIG. 1 and illustrates the relationship for the catalytic support.

It should be noted that the outer periphery of the catalyst bed 45 is spaced inwardly from the wall of the exhaust passage 27 of the spacer plate 22 so as to define an annular air flow path 47. Exhaust gases may also flow through this annular path as shown by the arrows in FIG. 2 but since this path is relatively narrow, the exhaust gases will have full contact with the outer surface of the catalyst bed 45 and thus be treated thereby.

The catalyst bed 45 is maintained in contact with the support plate 43 but is permitted to expand and contract relative to it by means of a pair of support plungers 48 which are biased by coil compression springs 49 to centralize the positioning of the catalyst bed 45 in the exhaust passage 27. However, the springs 49 will yield when the catalyst bed 45 expands due to its higher heat and hence, the bed 45 is not constrained and will not crack due to thermal expansion. The flange 44 of the support plate 43 may be either spaced outwardly from the lower edge of the catalyst bed 45 or the support plate 43 may be formed of a material that will have the same thermal expansion as the bed 45.

A particle filter 51 is positioned at the upper point of the gap between the exhaust pipe inner and outer tubes 39 and 41 and this particle filter 51 may also be treated with a catalyst material so as to further treat the exhaust gases.

The exhaust gases are then discharged from the expansion chamber 34 downwardly into a further exhaust passage 52 formed at the lower portion of the drive shaft housing 23 and communicating with a like passage 53 formed in the lower unit 25 for discharge of the exhaust gases to the atmosphere through the body of water in which the watercraft is operating in a well known manner.

To minimize the amount of coolant that is added to the expansion chamber 34, there is provided a further drain passage 54 between the spacer plate cooling jacket 28 and the chamber 35 formed around the expansion chamber 31. This coolant will further cool the expansion chamber and can be drained back to the body of water in which the watercraft is operating in any well known manner.

It should be readily apparent that the aforedescribed construction is extremely effective in providing full catalytic treatment of all of the exhaust gases while at the same time permitting thermal expansion and contraction of the catalyst bed to be accommodated without generating any stresses on the bed. Of course, the foregoing description of that of a preferred embodiment of the invention and various changes and modifications may be made without departing from the spirit and scope of the invention, as defined by the appended claims.

I claim:

1. A catalytic exhaust treatment system for an outboard motor comprised of an internal combustion engine having an exhaust outlet port, an exhaust pipe having an inlet end communicating with said exhaust port, an outlet end and an inner surface defining a gas flow path from said inlet end to said outlet end for communicating exhaust gases to the atmosphere, a catalyst support in said exhaust pipe extending at least in part across said gas flow path, said catalyst support comprising cross bars upon which a catalyst is supported, said catalyst having an upstream end facing said inlet end and a downstream end facing said outlet end, said downstream end being supported on said catalyst support, said catalyst having an outer periphery between said upstream end and said downstream end spaced inwardly from said inner surface of said exhaust pipe, said catalyst being supported on said catalyst support for movement of said outer periphery transversely relative to said inner surface of said exhaust pipe, wherein the catalyst is configured so as to permit exhaust gases to flow through said catalyst and also wherein the outer periphery of the catalyst is adapted to treat the exhaust gases flowing between the catalyst and the inner surface of the exhaust pipe.

2. A catalytic exhaust treatment system as set forth in claim 1 wherein the catalyst is spring biased to a centralized position within the inner surface of the exhaust pipe.

3. A catalytic exhaust treatment system as set forth in claim 1, further including means for further treating the exhaust gases that flow around the outer periphery of the catalyst.

4. A catalytic exhaust treatment system as set forth in claim 1 wherein the exhaust outlet port is formed in a lower face of the engine that is supported on a support plate interposed between the engine and a drive shaft housing, an expansion chamber formed in said drive shaft housing, said exhaust pipe being comprised of a first portion extending through the support plate and in which the catalyst is positioned and a second double walled portion positioned in the expansion chamber and depending from the catalyst support with the exhaust gases flowing through the catalyst and into the expansion chamber.

5. A catalytic exhaust treatment system as set forth in claim 4 wherein the catalyst is spring biased to a centralized position within the exhaust pipe.

6. A catalytic exhaust treatment system as set forth in claim 5 further including means for further treating the exhaust gases that flow around the outer periphery of the catalyst.

7. A catalytic exhaust treatment system as set forth in claim 5, further including a filter for filtering only the exhaust gases that flow through the area between the catalyst and the interior of the exhaust pipe.

8. A catalytic exhaust treatment system as set forth in claim 1, further including a filter for filtering only the exhaust gases that flow through the area between the catalyst and the interior of the exhaust pipe.

* * * * *